United States Patent [19]

Scott et al.

[11] Patent Number: 5,160,004

[45] Date of Patent: Nov. 3, 1992

[54] CLUTCH/BRAKE MECHANISM

[75] Inventors: Michael P. Scott, Midland; Andrew C. Cutler, Mt. Pleasant, both of Mich.

[73] Assignee: DANA Corporation, Toledo, Ohio

[21] Appl. No.: 750,184

[22] Filed: Aug. 26, 1991

[51] Int. Cl.⁵ ............................................ F16D 67/02
[52] U.S. Cl. ................................ 192/17 R; 192/93 A; 56/11.3
[58] Field of Search ................ 192/17 R, 18 R, 93 A; 56/11.3

[56] References Cited

U.S. PATENT DOCUMENTS

| | | | |
|---|---|---|---|
| 1,010,366 | 11/1911 | Herndon | 192/63 |
| 1,579,903 | 4/1926 | Yungling | 192/12 R |
| 2,709,531 | 5/1955 | Mercier et al. | 214/357 |
| 2,931,476 | 4/1960 | Zeidler et al. | 192/89 R |
| 3,319,493 | 5/1967 | Halls et al. | 74/792 |
| 3,386,545 | 6/1968 | Hansen | 192/18 R |
| 3,680,669 | 8/1972 | Hansen | 192/18 R |
| 4,205,509 | 6/1980 | Miyazawa et al. | 192/18 R X |
| 4,333,303 | 6/1982 | Plamper | 56/11.3 |
| 4,372,433 | 2/1983 | Mitchell et al. | 192/18 R |
| 4,538,712 | 9/1985 | Nagai | 192/18 R |
| 4,923,040 | 5/1990 | Buckley | 192/18 R |
| 4,924,989 | 5/1990 | Page | 56/11.3 X |
| 5,033,595 | 7/1991 | Pardee | 56/11.3 X |

Primary Examiner—Rodney H. Bonck
Assistant Examiner—Andrea Pitts
Attorney, Agent, or Firm—R. William Graham; Robert M. Leonardi

[57] ABSTRACT

A clutch/brake mechanism designed for use in a power driven system which delivers relatively high braking and driving power while avoiding simultaneous engagement of the clutch and the brake includes a device for actuating the clutch and the brake such that the clutch is effectively engaged by relatively slight actuation of the actuator device and the brake is effectively engaged by relatively considerable actuation of the actuator device.

7 Claims, 3 Drawing Sheets

CLUTCH/BRAKE MECHANISM

BACKGROUND OF THE INVENTION

The present invention relates to an improved clutch/brake mechanism. More particularly, this invention relates to a clutch/brake mechanism for a power driven mechanism.

Many types of clutch/brake mechanisms have been used in powered apparatuses, such as lawn mowers. For example, an axially-movable drum connected to a shaft has been placed between a driving disc and a brake. As the drum-like structure moves between first, intermediate and second positions on the shaft, the mechanism experiences the brake engaged/clutch disengaged, the brake disengaged/clutch disengaged, and the brake disengaged/clutch engaged, respectively. While this mechanism is directed at preventing simultaneous engagement of both the brake and clutch, it provides relatively poor braking and clutch power.

Another clutch/brake mechanism employs camming members between interleaved brake and clutch disks as are known in the art. The interleaved clutch and brake disks provide adequate clutch and brake power. However, the device creates undesirable simultaneous engagement of both the brake and clutch.

The present invention set forth below alleviates the problems and shortcomings associated with previous clutch/brake mechanisms.

SUMMARY OF THE INVENTION

The present invention is directed to a clutch/brake mechanism for use in a power driven system which delivers relatively high braking and driving power while avoiding simultaneous engagement of the brake and the clutch. The mechanism includes a drive shaft operatively connected to the power driven system. An output drive is rotatably connected to the shaft. Means are connected to the shaft for drivingly engaging the drive shaft to the output drive such that the drive shaft and the output drive are cooperatively rotatable.

Included in the mechanism is a brake for braking the output drive against rotation. Means are connected to the shaft for disengaging the drive engaging means. Means for actuating the disengaging means and the brake means are included, wherein effective disengaging of the engaging means occurs through relatively slight actuation of the actuator means and effective braking of the output drive occurs through relatively considerable actuation of the actuator means. The mechanism is further characterized in that substantially no simultaneous engagement of the engaging means and brake occurs throughout actuation of the actuator means.

DETAILED DESCRIPTION OF THE PREFERRED EMBODIMENT

Figure 1:
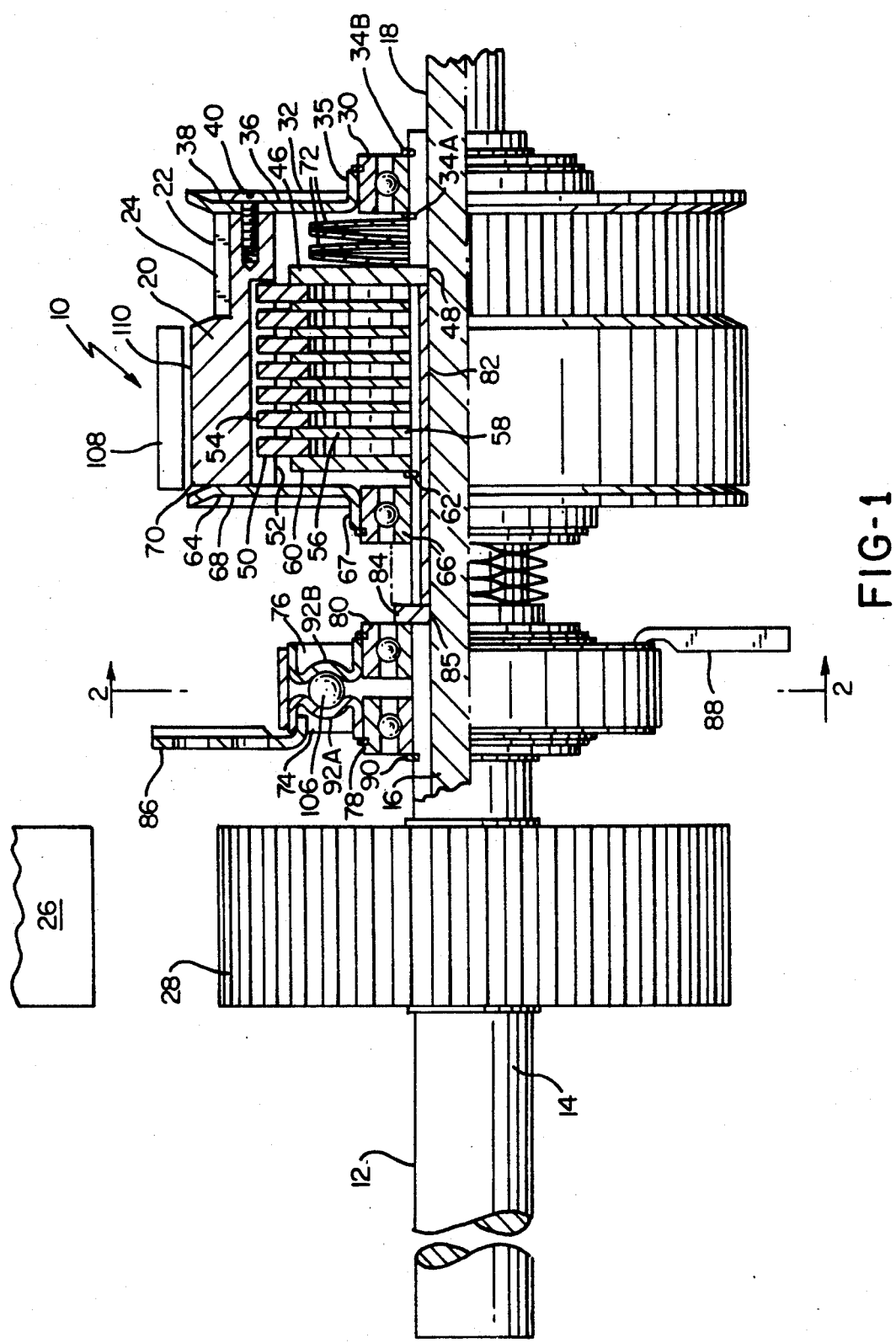
FIG. 1 is a sectional view taken along line 1—1 of FIG. 2.

The clutch/brake mechanism 10 of the present invention is shown in FIG. 1 for a rear wheel drive of a lawn mower. Such a mower would have two clutch/brake mechanisms, one associated with each rear wheel for driving and steering the mower. The mechanism includes a drive shaft 12 having an inner portion 14, an intermediate portion 16 and an outer portion 18. Disposed about the outer portion 18 is a generally cylindrical housing 20 having a reduced diameter portion 22 with grooves 24 to form a high torque drive sprocket. The power drive system 26 includes a high torque drive sprocket 28 for driving the drive shaft 12. The outer portion 18 of the shaft 12 provides support for bearings 30 for rotating a hub disk member 32 about the outer portion 18 of the shaft 12. A pair of snap rings 34a and 34b are connected to the shaft 12 to prevent axial movement of bearings 30.

The housing 20 is axially inwardly from and adjacent to the hub disk member 32. The hub disk member 32 has a hub portion 35 and a disk portion 36. The housing 20 and hub disk member 32 are substantially coaxial about the shaft 12 with the housing 20 having an outer rim portion 38 abutted and connected to the disk portion 36 of hub disk member 32 by bolts 40.

Figure 2:
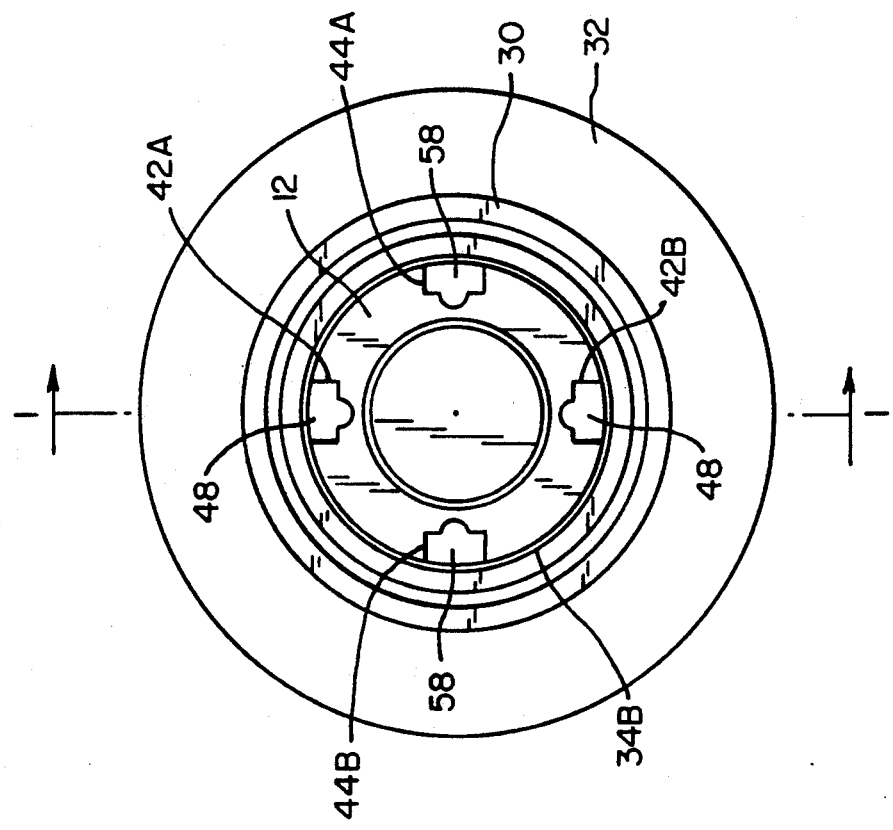
FIG. 2 is an end view.

The shaft 12 has keyways 42a and 42b, and 44a and 44b (see FIG. 2). A pressure plate 46 is axially slidably connected to the shaft 12 and inwardly adjacent the hub disk member 32. The pressure plate 46 has lugs 48 which extend radially inwardly and key to keyways 42a and 42b.

The housing 20 has a plurality of grooves 50 in its inner wall surface 52. Driven clutch plates 54 are axially slidably disposed within the grooves 50 and extend radially inwardly toward the shaft 12. The axially outermost of the clutch plates 54 is adjacent to the pressure plate 46. Disposed between the driven clutch plates 54 are a number of driving clutch plates 56. Each of the driving clutch plates 56 have lugs 58 extending radially inwardly which key to keyways 44a and 44b (see FIG. 2). While it is preferred to have a plurality of driving and driven clutch plates, the use of one driving and one driven clutch plate could also work. A pressure plate 60 is connected to the shaft 12 axially inwardly from and adjacent to the axially innermost of the driven clutch plates 54. A snap ring 62 is connected to the shaft 12 to prevent axial inward movement of the pressure plate 60. A second hub disk member 64 is disposed axially inwardly from the housing 20. The second hub disk member 64 is mounted on bearings 66 for rotating the second hub disk member 64 about the shaft 12. Hub disk member 64 has a hub portion 67 and a disk portion 68 similarly connected by bolts to an inner rim portion 70 of the housing 20.

Four Belleville springs 72 are disposed between the snap ring 34a and pressure plate 46 to bias against the pressure plate 46 so that the driven clutch plates 54 frictionally engage the driving clutch plates 56. A diaphragm or coil spring could be used to bias the pressure plate 46. Camming members 74 and 76 are mounted on bearings 78 and 80, respectively, for relative rotation about the intermediate portion 16 of the shaft 12. Elongated disengaging members or pins 82 are slidably disposed in the keyways 42a and 42b. A ring 84 is axially slidably connected to the shaft 12 adjacent to and between bearings 80 and the pins 82. The ring 84 has lugs 85 which key to keyways 42a and 42b. Alternatively, the pins 82 and ring 84 could be one integral part.

Camming arms 86 and 88 are attached to the camming members 74 and 76, respectively, and extend radially outwardly from camming members 74 and 76 at approximately 180° from each other in their operating positions. The camming arms 86 and 88 are operatively connected to a manual control lever (not shown) which controls the degree of relative rotation between the camming members 74 and 76. A snap ring 90 is connected to the shaft 12 to prevent axial inward movement of the camming member 74.

Figure 4:
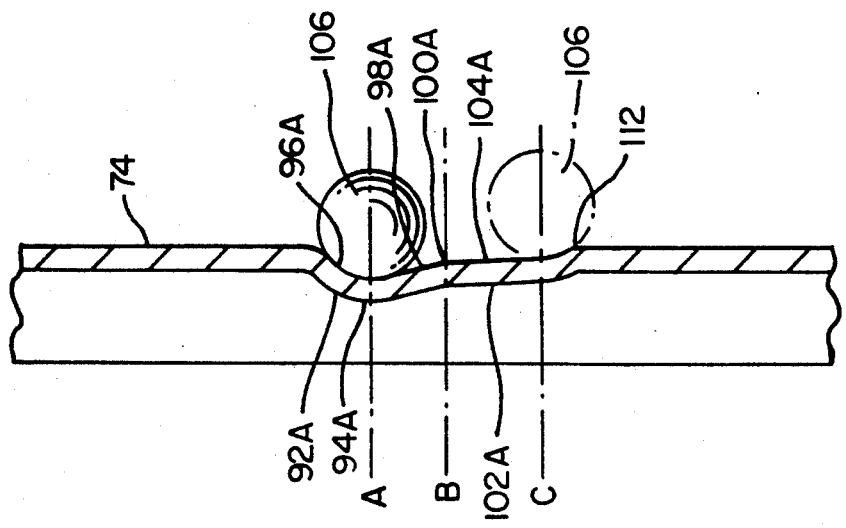
FIG. 4 is a sectional view through line 3—3 of FIG. 3.

A unique aspect of the preferred embodiment of the present invention resides in the camming members 74 and 76. Camming member 74 preferably has three cam channels 92a (see FIG. 3). Similarly, camming member 76 has three cam channels 92b. As seen in FIG. 4, cam channel 92a has a well portion 94a which is defined by relatively steep incline portions 96a and 98a. Incline portion 98a rises relatively sharply to a point 100a. Adjoining point 100a is shallow portion 102a which is defined by a relatively flat wall portion 104a. The well portions 94a and 94b are a relatively small percentage of the total length of the cam channels 92a and 92b. Together, well portion 94a and shallow portion 102a make up the cam channel 92a. Cam channel 92b is similarly formed. Rollingly disposed between the complementary cam channels 92a and 92b are cam balls 106.

A band brake 108 (see FIG. 1) is made to frictionally contact surface 110 of the housing 20. The brake is connected to the control lever at one end and grounded to the frame at its other end and extends around surface 110 without contacting surface 110 in its unactuated position. By design, the amount of braking power which can be delivered to the housing 20 is substantially proportional to the degree of relative rotation between the camming members 74 and 76. In this case, the braking power is a function of the length of the complimentary cam channels 92a and 92b. Instead of a band brake, a brake pad could be used which would be mounted to the frame and spaced from the surface 110. In such case the brake pad would similarly engage the surface 110 and apply braking power as a function of relative rotation of the camming members 74 and 76.

By using the camming members 74 and 76, disengaging of the clutch plates 54 and 56 and braking of the housing 20 can be controlled by the one lever. It is also contemplated that separate control levers could be used, one connected to camming members for disengaging clutch plates and another for actuating the brake.

Figure 3:
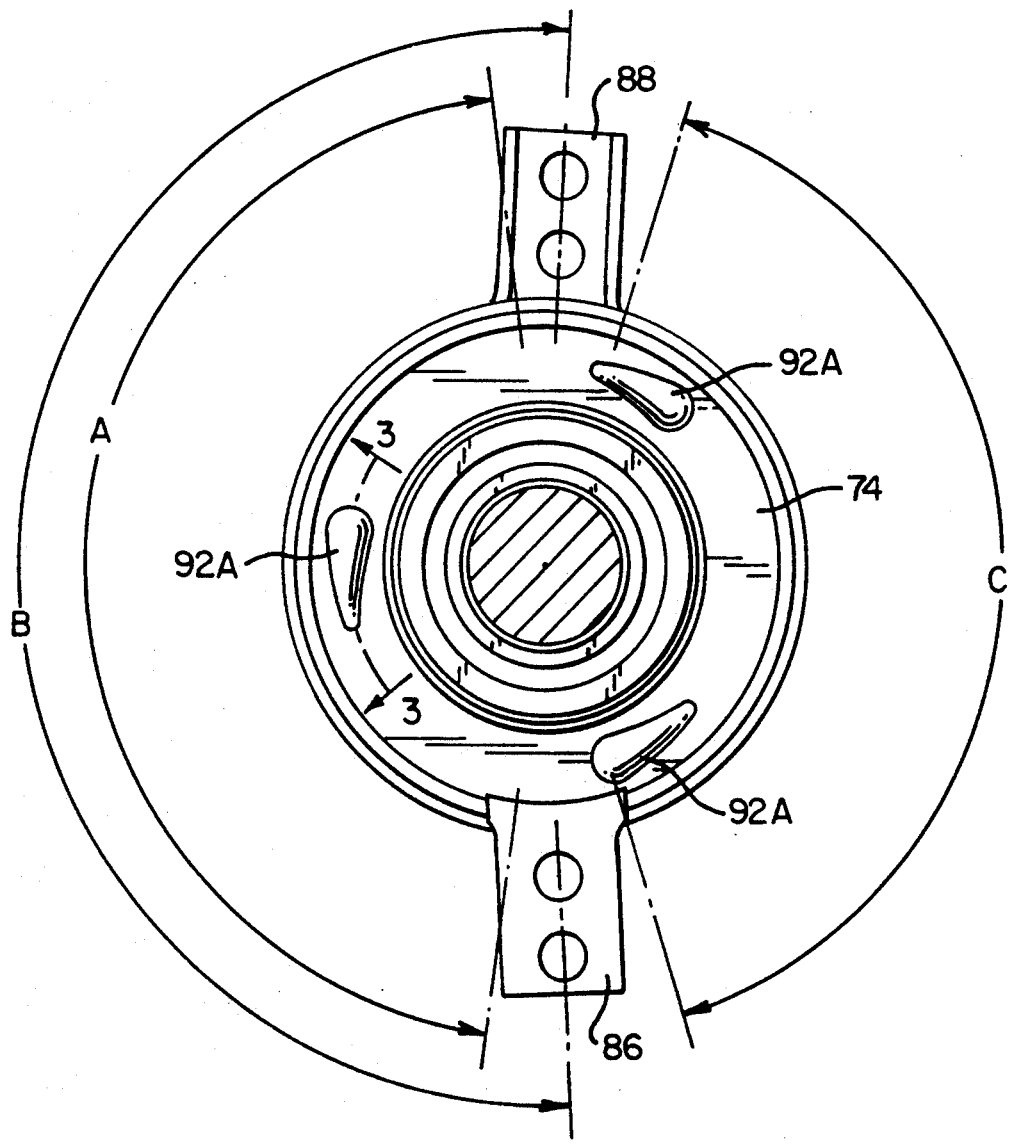
FIG. 3 is a sectional view taken along line 2—2 of FIG. 1.

Position A is shown in FIG. 3 and 4, wherein the clutch is engaged and the brake is disengaged. Camming balls 106 rest in the deepest point of well portions 94a and 94b, and camming arm 86 is about 165° separated from camming arm 88.

As viewed in FIG. 3, when camming arm 86 is counterclockwise rotated relative to camming arm 88, the arms 86 and 88 approach about 185° separation. Camming balls 106 move up incline portions 98a and 98b toward points 100a and 100b, respectively, as seen in FIG. 4. This causes a relatively large and quick separation of camming members 74 and 76. In turn, camming member 76 moves axially outwardly actuating the ring 84 and the pins 82 so that the pressure plate 46 moves axially outwardly to disengage the driven clutch plates 54 from driving clutch plates 56. At position B, the camming arms 86 and 88 at about 185° separation, the camming balls 106 are positioned about the points 100a and 100b and the clutch plates 54 and 56 and brake 108 are disengaged.

In position C, the clutch plates 54 and 56 are disengaged and the brake 108 is engaged. In moving into position C (as seen in FIG. 3), the camming arm 86 is further counterclockwise rotated relative to camming arm 88 to about 215° separation and camming balls 106 move toward terminating points 112a and 112b of the shallow portions 102a and 102b, respectively.

The present invention provides for a clutch/brake mechanism which reduces operator lever force and travel. The present invention delivers relatively high driving and braking power while controlling the engaging/disengaging of the clutch/brake mechanism so that engaging or disengaging of either the brake or clutch can take place separately from disengaging or engaging of the clutch or brake, respectively. Another advantage is that the this clutch/brake mechanism requires relatively few parts and is relatively easy to assemble. Still another advantage of the present invention is that it provides for positive forward and reverse torque.

The present invention has been set forth above in a specific embodiment, although not for the purpose of limiting the scope of the invention. It is conceived that derivations, alterations, modifications and improvements will be readily apparent to those skilled in the art.

What is claimed is:

1. A clutch/brake mechanism for use in a power driven system, comprising:
   a drive shaft operatively connected to the power driven system;
   an output drive rotatably connected to said shaft;
   means connected to said shaft for drivingly engaging said shaft to said output drive such that said shaft and said output drive are cooperatively rotatable, wherein said engaging means are normally engaged with said output drive;
   a brake for braking said output drive against rotation;
   means connected to said shaft for disengaging said drive engaging means; and
   means connected to said shaft for actuating said disengaging means and said brake, wherein disengaging of said engaging means occurs through relatively slight actuation of said actuator means and braking of said output drive occurs through relatively considerable actuation of said actuator means, said mechanism further characterized such that substantially no simultaneous engagement of said engaging means and said brake occurs throughout actuation of said actuator means, and wherein braking force increases with increased actuation of said actuator means.

2. The clutch/brake mechanism of claim 1, wherein said actuating means includes a first camming member rotatably connected to said shaft adjacent said disengaging means and operatively connected to said brake, and a second camming member connected to said shaft adjacent said first camming member and operatively connected to said brake, said second camming member being fixed to prevent axial movement away from said first camming member, said first camming member and said second camming member each including at least one complementary cam channel having a camming ball disposed therebetween, wherein the profile of each said cam channel in the direction of camming ball movement is characterized by a well portion and a more shallow portion, the transition between said well portion and said shallow portion having a stepped aspect.

3. A clutch/brake mechanism for use in a power driven system, comprising:

a drive shaft operatively connected to the power driven system, wherein said shaft includes a plurality of keyways longitudinally extending through the periphery of at least a portion of said shaft;

an output drive rotatably connected to said shaft, an elongated member slidably disposed in a first keyway of said keyways;

a ring slidably disposed on said shaft adjacent a first end of said elongated member and having a lug keyed to said first keyway;

an output drive including a generally hollow cylinder disposed about said portion of said shaft, said cylinder having a plurality of annular grooves about an inner surface and a hub disk member rotatably connected to said shaft adjacent a second end of said elongated member and fixed to prevent axial movement, said hub disk member connected to a rim portion of said cylinder;

a brake for braking said output drive against rotation; and a first pressure plate slidably disposed on said portion of said shaft adjacent and between said second end of said elongated member and said hub disk member and which extends radially outwardly from said shaft toward said inner surface of said cylinder, said first pressure plate having a lug keyed to said first keyway of said keyways, a second pressure plate disposed on said shaft between said first pressure plate and said ring and which extends radially outwardly from said shaft toward said inner surface of said cylinder, said first pressure plate having a lug keyed to said first keyway of said keyways, a second pressure plate disposed on said shaft between said first pressure plate and said ring and which extends radially outwardly from said shaft toward said inner surface of said cylinder, wherein said second pressure plate is fixed to prevent axial movement toward said ring, a plurality of interleaved driven clutch plates and driving clutch plates disposed between said first pressure plate and said second pressure plate, said driven clutch plates being splined to said grooves of said inner surface of said cylinder, said driving clutch plates each having a lug keyed to a second keyway of said keyways, and means disposed between said hub disk member and said first pressure plate for biasing against said first pressure plate so that said driving clutch plates frictionally engage said driven clutch plates.

4. A clutch/brake mechanism for use in a power driven system, comprising:

a drive shaft operatively connected to the power driven system;

an output drive rotatably connected to said shaft;

means connected to said shaft for drivingly engaging said shaft to said output drive such that said shaft and said output drive are cooperatively rotatable, wherein said engaging means are normally engaged with said output drive;

a brake for braking said output drive against rotation;

means connected to said shaft for disengaging said drive engaging means; and a first camming member rotatably connected to said shaft adjacent said disengaging means and operatively connected to said brake, and a second camming member connected to said shaft adjacent said first camming member and operatively connected to said brake, said second camming member being fixed to prevent axial movement away from said first camming member, said first camming member and said second camming member each including at least one complementary cam channel having a camming ball disposed therebetween, wherein the profile of each said cam channel in the direction of camming ball movement is characterized by a well portion and a more shallow portion, the transition between said well portion and said shallow portion having a stepped aspect, wherein effective disengaging of said engaging means occurs as said first camming member is rotated such that said ball moves across said transition from said well portion to said more shallow portion of said cam channel causing separation of said camming members such that said first camming member actuates said disengaging means to cause disengaging of said engaging means and effective braking of said output drive occurs as said first camming member is further rotated which is permitted by said ball moving further along said shallow portion and wherein braking force increases as said first camming member continues to rotate, said mechanism further characterized such that substantially no simultaneous engagement of said engaging means and said brake occurs as said ball moves throughout said cam channel of each said camming member.

5. A clutch/brake mechanism for use in a power driven system, comprising:

a drive shaft operatively connected to the power driven system which includes a plurality of keyways longitudinally extending through the periphery of at least a portion of said shaft;

an elongated member slidably disposed in a first keyway of said keyways;

a ring slidably disposed on said shaft adjacent a first end of said elongated member and having a lug keyed to said first keyway;

a generally hollow cylinder disposed about said portion of said shaft, said cylinder having a plurality of annular grooves about an inner surface;

a first pressure plate slidably disposed on said portion of said shaft adjacent a second end of said elongated member and which extends radially outwardly from said shaft toward said inner surface of said cylinder, said first pressure plate having a lug keyed to said first keyway of said keyways;

a second pressure plate disposed on said shaft between said first pressure plate and said ring and which extends radially outwardly from said shaft toward said inner surface of said cylinder, wherein said second pressure plate is fixed to prevent axial movement toward said ring;

a plurality of interleaved driven clutch plates and driving clutch plates disposed between said first pressure plate and said second pressure plate, said driven clutch plates being splined to said grooves of said inner surface of said cylinder, and said driving clutch plates each having a lug keyed to a second keyway of said keyways;

a hub disk member rotatably connected to said shaft adjacent said first pressure plate and fixed to prevent axial movement, said hub disk member connected to a rim portion of said cylinder;

means disposed between said hub disk member and said first pressure plate for biasing against said first pressure plate so that said driving clutch plates frictionally engage said driven clutch plates;

a brake for braking said cylinder against rotation; and means for actuating said ring toward said first pressure plate and for actuating said brake toward said cylinder, wherein effective disengaging of said clutch plates occurs through relatively slight actuation of said actuator means and effective braking of said cylinder occurs through relatively considerable actuation of said actuator means.

6. The clutch/brake mechanism of claim 5, wherein said actuating means includes a first camming member rotatably connected to said shaft adjacent said ring and operatively connected to said brake, and a second camming member connected to said shaft adjacent said first camming member and operatively connected to said brake, said second camming member being fixed to prevent axial movement away from said first camming member, said first camming member and said second camming member each including at least one complementary cam channel having a camming ball disposed therebetween, wherein each said cam channel has a well portion and a shallow portion, said well portion defined by a first and second relatively steep incline portion, and said shallow portion adjoining and extending from a terminating point of said second incline and defined by a relatively flat incline portion.

7. A clutch/brake mechanism for use in a power driven system, comprising:

a drive shaft operatively connected to the power driven system which includes a first pair of keyways and a second pair of keyways which longitudinally extend through the periphery of at least a portion of said shaft;

a pair of elongated members slidably disposed in said first pair of keyways;

a ring slidably disposed on said shaft adjacent a first end of each said elongated member and having a pair of lugs keyed to said first pair of keyways;

a generally hollow cylinder disposed about said portion of said shaft, said cylinder having a plurality of annular grooves about an inner surface;

a first pressure plate slidably disposed on said portion of said shaft adjacent a second end of each said elongated member and which extends radially outwardly from said shaft toward said inner surface of said cylinder, said first pressure plate and having a pair of lugs keyed to said first pair of keyways;

a second pressure plate disposed on said shaft between said ring and said first pressure plate and which extends radially outwardly from said shaft toward said inner surface of said cylinder, wherein said second pressure plate is fixed to prevent axial movement toward said ring;

a plurality of interleaved driven clutch plates and driving clutch plates disposed between said first pressure plate and said second pressure plate, said driven clutch plates being splined to said grooves of said inner surface of said cylinder, and said driving clutch plates each having a pair of lugs keyed to said second pair of keyways;

a hub disk member rotatably connected to said shaft adjacent said first pressure plate and fixed to prevent axial movement, said hub disk member connected to a rim portion of said cylinder;

means disposed between first hub disk member and said first pressure plate for biasing against said first pressure plate so that said driving clutch plates frictionally engage said driven clutch plates;

a brake for braking said cylinder against rotation;

a first camming member rotatably connected to said shaft adjacent said ring and operatively connected to said brake, and a second camming member connected to said shaft adjacent said first camming member and operatively connected to said brake, said second camming member being fixed to prevent axial movement away from said first camming member, said first camming member and said second camming member each including at least three complementary cam channels having a camming ball disposed therebetween, wherein each said cam channels has a well portion and a shallow portion, said well portion defined by a first and second relatively steep incline portion, and said shallow portion adjoining and extending from a terminating point of said second incline and defined by a relatively flat incline portion, wherein effective disengaging of said clutch plates occurs as said first camming member is rotated such that said ball moves along said second incline portion of each said camming member and effective braking of said output drive occurs as said first camming member is further rotated such that said ball moves along said relatively flat portion of each said camming member.

* * * * *